US005219634A

United States Patent [19]

Aufderhaar

[11] Patent Number: 5,219,634

[45] Date of Patent: Jun. 15, 1993

[54] SINGLE COMPRESSION MOLDED MOISTURE RESISTANT WOOD PANEL

[75] Inventor: Christine Aufderhaar, Lake Mills, Wis.

[73] Assignee: Formholz, Inc., Watertown, Wis.

[21] Appl. No.: 640,782

[22] Filed: Jan. 14, 1991

[51] Int. Cl.[5] ........................ B32B 3/00; B32B 27/10; E06B 3/70

[52] U.S. Cl. .................................... 428/156; 428/157; 428/220; 428/274; 428/481; 428/537.1; 156/220; 52/455

[58] Field of Search ...................... 428/481, 537.1, 274, 428/220, 156, 157

[56] References Cited

U.S. PATENT DOCUMENTS

| | | | |
|---|---|---|---|
| 3,108,030 | 10/1963 | Taylor | 428/481 |
| 3,334,464 | 8/1967 | Charles | 52/620 |
| 3,413,188 | 11/1968 | Allen | 428/481 |
| 4,007,569 | 2/1977 | Hascall | 52/614 |
| 4,132,042 | 1/1979 | Di Mario | 428/116 |
| 4,146,662 | 3/1979 | Eggers | 428/68 |
| 4,236,365 | 12/1980 | Wheeler | 52/455 |
| 4,533,589 | 8/1985 | Sewell | 428/481 X |
| 4,610,119 | 9/1986 | Beach, Sr. | 52/309.3 |
| 4,630,420 | 12/1986 | Hagemeyer | 52/313 |
| 4,636,443 | 1/1987 | Jaisle et al. | 428/481 |
| 4,812,188 | 3/1989 | Hansen | 156/220 |
| 4,844,968 | 7/1989 | Persson et al. | 428/181 |
| 4,864,789 | 9/1989 | Thorn | 52/309.9 |

*Primary Examiner*—P. C. Sluby
*Attorney, Agent, or Firm*—Wheeler Law Firm

[57] ABSTRACT

A compression formed panel of a wood fiber board and a plastic resin means impregnated into the wood fiber board for maintaining the shape of said door core or panel after compression, and a method for making same requiring either a catalyst that causes the plastic resin to set at a temperature in excess of 100° Celsius, or a catalyst that causes the plastic resin to set or polymerize at a temperature lower than 100° Celsius.

The method includes a first step in which the wood fiber board is dipped into a plastic resin material mixture, containing the necessary catalyst for causing the plastic resin material to set, for a time sufficient for the wood fiber board to absorb a portion of the plastic resin material mixture; a second step in which the wood fiber board is placed in a compression means for compressing the compressible wood fiber board for a time sufficient to set the plastic resin material contained in the compressible wood fiber board, and a third step in which the resulting wood fiber panel is removed from the compression means. An optional step after the first step includes adding a fairing compound along the parts to be three dimensional.

14 Claims, 3 Drawing Sheets

SINGLE COMPRESSION MOLDED MOISTURE RESISTANT WOOD PANEL

BACKGROUND OF THE INVENTION

The instant invention relates to a compression molded panel and specifically to the treatment of a compression molded panel to yield a water proof, single piece, structurally strong storm door core or panel that has the strength and feel of solid wood but is instead made from a wood fiber or wood chip board, preferably of a low initial density.

The applicant knows of no prior art which teaches the unique features and designs of his invention. For example, U.S. Pat. No. 4,007,569 (Hascall), discloses a method for sealing the edges of an exterior wooden door by overlaying a thin, vinyl plastic tape over the edge of the door and bonding the tape with an adhesive. U.S. Pat. No. 4,146,662 (Eggers, et al), discloses a warp and weather resistant solid core wood door having an overlaid laminate of phenolic resin-impregnated paper and veneer bonded in a heated press to the front and rear surfaces of a core material such as particle board. No single piece compressible resin impregnated structure like that of the instant invention is shown or described. U.S. Pat. No. 4,236,365 (Wheeler), describes a door formed from a core of compressed wooden particles mixed with an adhesive in a heated press. The door is provided with a solid wooden edge frame and high density exterior of cellulosic fibers. The door may be embossed on one or both exterior surfaces to provide a decorative panel pattern. The structure of the Wheeler door is made up of wood particles that are compressed between two high density skins 14 and 16. Again, single piece construction like that of the instant invention is not disclosed, and applicant's unique way of achieving sharp molding profiles is not disclosed either.

U.S. Pat. No. 4,610,119 (Bench, Sr.), discloses a laminated exterior door having two poly-carbonate sheets adhesively bonded to a composite wooden substrate or core of solid fiberboard. The adhesive consists of a moisture curing urethane that remains somewhat tacky after bonding. This is not the structure or method of the instant invention. U.S. Pat. No. 3,334,464 (Charles) discloses a door comprising more than one layer of material surrounding a plastic foam core. U.S. Pat. No. 4,630,420 (Hagemeyer) discloses a thermal and moisture resistant door comprising a perimeter framework with a laminated skin glued to the interior and exterior sides of the framework, with an insulative core material therebetween. This structure is completely counter to the one piece panel construction and structure disclosed hereafter by the applicants. U.S. Pat. No. 4,812,188 (Hanson) merely discloses a method of producing doors or other panel elements with the appearance of an in-filled panel type; the panelling pattern achieved through a simple relief pressing of a thin covering plate member which is mounted on a carrier frame work. The covering plate member, coated by a veneer or paper, is produced from wood fiber or a chip mass which is pressed and heated only to the extent that the plate material becomes leather-like; without the incorporated binding agent being hardened. By the relief pressing of the covering plate, heat is supplied in such a manner that the binding agent hardens after the final deformation pressure has been applied. Essentially this reference discloses a method of laminating using a very thin chip board base member so that the final product is made up of more than one layer of material; all the layers being bonded together. Accordingly, the instant invention is neither taught nor disclosed. U.S. Pat. No. 4,844,968 (Persson, et al) discloses a heat form pressed product, namely a door skin, and a method of manufacturing such an object. The door skin disclosed comprises a resin impregnated outer layer arranged directly onto a layer of a binder impregnated wood fine chips that act as a support for the fiber sheet material. However, this resin impregnated layer is crepe paper. Crepe paper is very thin and, unlike the wood fiber panel of the instant invention, would lack the necessary strength unless it was bound or laminated to another structure as Persson describes. The apparent purpose of the crepe paper is to produce an acceptable surface quality. The crepe paper alone could not form a door core, siding panel, or the like. A layer of coarse wood chips is disclosed as acting as to define the reinforcing and handling characteristics of the relatively large (some $m^2$) and relatively thin (2 to 5 mm) door skin. This patent does disclose the use of a resin impregnated layer as one of the layers used in forming the door skin, however the structure and method disclosed are not the same as the structure and method of the applicants which creates a complete door core or panel, not a door skin, out of one layer of compressible wood fiber material. Essentially the Persson patent discloses a laminating process in which a door skin is directly bonded to a layer of wood chips to form a door having depressions or panels. This is completely different from the method and structure of the applicant in which a door core is made from a single compressible wood fiber board impregnated with an unsaturated polyester resin. U.S. Pat. No. 4,864,789 (Thorn) discloses a compression molded door assembly in which no frame is needed because the edges of the opposed door skins include integral mating edge members over at least a portion of the side edges. While the door skins are made from unsaturated polyester polymers blended with vinyl monomers such as styrene, the skins do not form the whole door nor are they made by mixing the polymers with wood fiber board. A filler material that is added to the polymers is disclosed but the function of these fillers is not the same as disclosed herein. The skins are designed to be mounted onto a core; like the foamed core 13 disclosed in the Thorn patent. The structure and method of the applicant is neither suggested nor disclosed. None of the above cited prior art reveals the method or structure of the applicant's unique invention.

It is the primary objective of the present invention to produce a wood fiber or wood chip compressed panel into which plastic resin has been introduced through the surface of the wood fiber board so the resin at least encapsulates the wood material of the board located on the surface of the board and, preferably, at least a slight depth below the surface of the wood board; so that the resin may be fused or set while it encapsulates at least a portion of the wood structure of the board whereby an essentially moisture impervious panel having good strength characteristics is produced. The panel so produced is for use as a door core or any other use, such as outdoor siding, in which a moisture resistant or impervious panel having excellent strength and durability characteristics is desired.

It is an objective of the instant invention to produce a door core product that is preferably 33 percent plastic and 67 percent wood. The strength and flexibility of this product far exceeds particle board which is standard in the wood core business. The product has excellent insulating properties, in that the composition is preferably wood fiber (insulating board) encased or encapsulated on all sides and edges with a layer of plastic. The above characteristics enable the product to provide long term durability.

It is a further objective of this invention to have a method of manufacture produced door cores or panels from compressible wood fiber board that have the strength and aesthetic raised panel or other three dimensional look of machined solid wood cores that are currently available on the market today.

It is another objective of this invention to produce a door core or panel that is superior to particle board laminated cores that are available on the market today. Currently available particle board panels simulate the raised panel design feature by applying plastic or aluminum molded parts which are screwed onto the face of the door. This leaves the wood cores of these doors and panels vulnerable to moisture penetration that will causes the vinyl or aluminum to delaminate. Further, the colors of these added parts must be matched to the color of the door core or panel. The instant invention overcomes these problems by providing a door core or panel that can have an integral design and need little or no extra finishing work performed upon it before shipment.

In the claims and specification of this patent the following terms, in addition to their normal meanings, should be interpreted and understood to have the following meanings:

Impregnate: To penetrate or encapsulate less than all parts of a substance.

Catalyst: 1. One or more polymerization initiating materials capable of initiating polymerization with or without additional heat or pressure. 2. One or more materials capable of causing a resin material to set-up or solidify.

Wood Fiber Board: A substantially solid wood board comprised of wood chips or wood fibers or cellulosic fibers and capable of being compressed.

If there is a contradiction between an above stated meaning of a term and its common meaning, the definition of the term or word will be interpreted as covering both meanings inclusively so as not to exclude one or the other.

SUMMARY OF THE INVENTION

The invention is a compression formed panel and a method for making same.

The compression formed panel is comprised of a wood fiber board and a plastic resin means impregnated into the wood fiber board for maintaining the shape of the panel after compression.

The method for making the compression formed door core or panel requires a compressible wood fiber panel or board, either having a catalyst that causes the plastic resin to set at a temperature in excess of 100° Celsius and a water content sufficiently small to prevent the production of amounts of steam sufficient to damage the compressible wood fiber board or having a catalyst that causes the plastic resin to set or polymerize at a temperature lower than 100° Celsius, and a plastic resin material.

The method essentially comprises: a first step in which the wood fiber board is dipped into a plastic resin material mixture, containing the necessary means for causing the plastic resin material to set, for a time sufficient for the wood fiber board to absorb a portion of the plastic resin material mixture; a second step in which the wood fiber board is placed in a compression means for compressing the compressible wood fiber board for a time sufficient to set the plastic resin material contained in the compressible wood fiber board; a third step in which the resulting wood fiber panel is removed from the compression means. An optional step, between the first and second step, in which a fairing or filling compound may be added over an area where a three dimensional impression is desired to be made in the panel, may be added so that tearing of the area of the panel where the impression is made is avoided the design pressed into the panel is clearly and cleanly defined.

Any type of catalyst may be used that causes the plastic resin to set. Catalysts that cause the plastic resin to set at a temperature below the boiling point of water would allow the use of compressible wood fiber boards having a relatively high moisture content because there would be no need to heat the wood fiber board as it is molded or compressed in order to cause the plastic resin to set. This would eliminate the problem of the production of steam but the expense of such catalysts, as well as the difficulty of working with such catalysts, makes their use less preferable.

DETAILED DESCRIPTION

Figure 1:
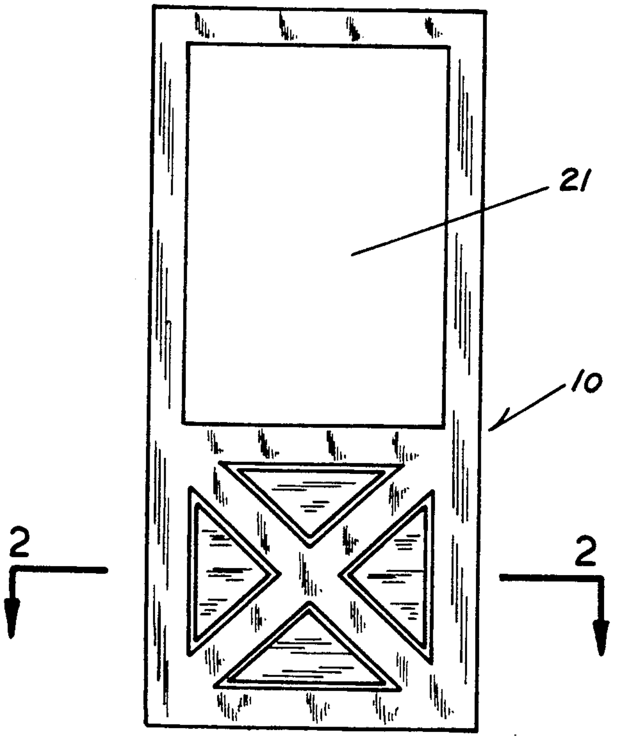
FIG. 1 is a front elevational view of a completed door using the process of this invention.

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

While any type of panel may be produced by the method of the present invention this description shall specifically describe the production of a door core or panel 10.

The invention is a method for producing a unique panel or door core 10 composed of, preferably, 33 percent ployester resin and 67 percent wood fiber. The starting material is normally a compressible wood fiber board 20 having a density of approximately 16 to 18 pounds per cubic foot. It has been found that the best results are achieved when the compressible wood fiber board 20 is manufactured to specific specifications; this involves removing all binders and water inhibitors, i.e. asphalt, vegetable oil, sizing etc. These ingredients are normally added to fiberboard (the wood fiber board 20) and to the applicant's knowledge no one utilizes fiberboard that does not contain these ingredients.

The reason is for removing these ingredients from the compressible wood fiber board 20 is that a higher quality panel or door core 10 may be produced.

Experimentation has shown that compressible wood fiber or wood chip boards with these ingredients removed are usually better able to absorb a larger quantity of the polyester resin mixture 30 into which the boards 20 are dipped. However, panels or door cores 10 of lesser quality may be made from compressible wood fiber boards 30 that have not had the above noted ingredients removed from them.

Figure 6:
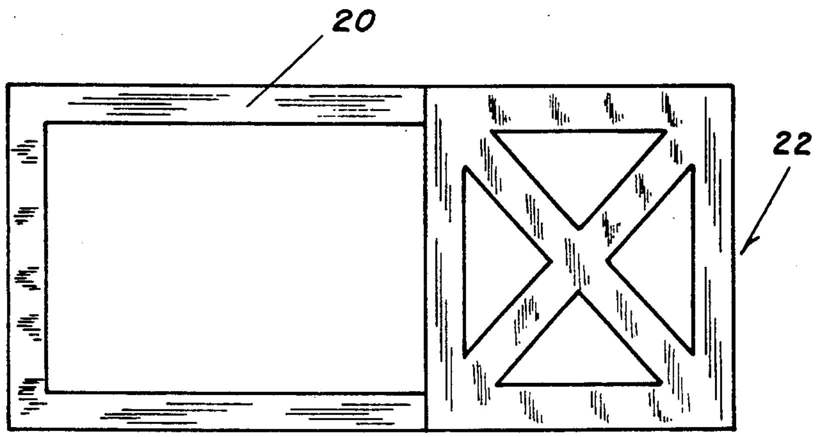
FIG. 6 is a top view of the template placed on top of a wood fiber board in order to mark the spots where filler should be applied.

Ideally the panel or door core 10 is made according to the following process:

1. A compressible wood fiber board 20, as previously described, is cut to size utilizing a sliding bed panel saw. Please see FIG. 6. The board 20 is cut to a dimension that is slightly larger than the dimensions of the finished panel or door core 10. This done because the compressible wood fiber board 20 tends to shrink slightly during the processing. For example, a wood fiber panel or board of 79.25 inches (202.3 cm) in length will normally lose 7/32 (0.55 cm) of one inch during the drying and pressing steps disclosed below; i.e. 0.3% of its length. If window openings 21 are required they may be added by using an overhead broken head router or other suitable tool.

Figure 7:
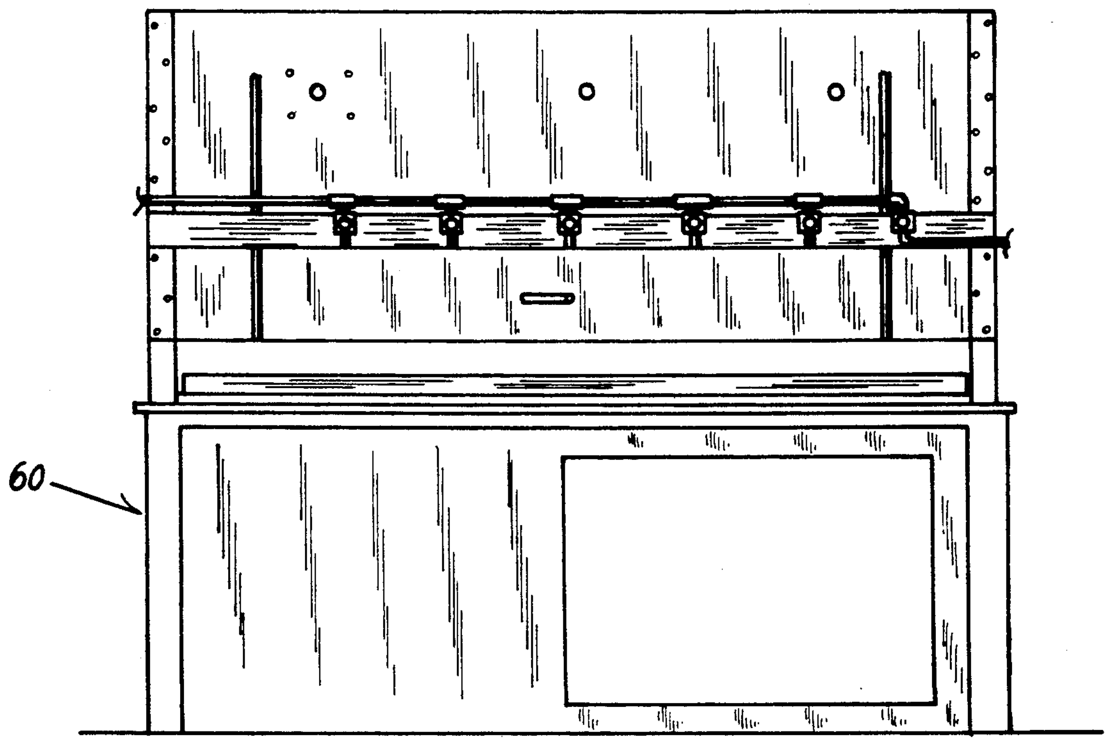
FIG. 7 is a side view of the heated press.

2. The board 20 is then sent to a drying oven where its predrying weight is reduced by approximately 6 to 8% by removing moisture contained in the board 20. Normally, approximately one pound or 454 grams of moisture is removed from a board 20 having an initial starting weight of approximately 16 pounds 5 ounces or 7.4 kilograms, for instance. 3. After removing the moisture from the board 20 it is sent to a dip tank 40, as shown in FIG. 7, where it is dipped into a plastic resin mixture containing an unsaturated polyester resin, catalysts, and mold release agents. The polyester resin mixture is ideally comprised of 1 part USP 245 peroxide or 2,5-dimethyl-2,5-bis (2-ethylhexanoylperoxy) hexane (peroxyester), available from Argus-US Peroxygen Products of Richmond, Calif., and 0.5 part Trigonox (TBPB) or tert-Butyl peroxybenzoate, available from AKZO Chemicals, Inc. of Chicago, Ill., as catalysts, 0.75 part SYNPRON (a liquid Zinc Sterate) as a mold release agent, and 97.25 parts unsaturated polyester resin or unsaturated polyester in monomer, available from Freeman Chemical Corporation of Port Washington, Wis., under the product name of STYPOL (40-2381).

The polyester resin mixture soaks or is absorbed into the compressible board 20. Normally about 6 to 8 pounds of the polyester resin mixture 20 soaks into a dry 15 pound board 20 so that the ratio of unpolymerized polyester resin mixture to dry board 20 is approximately 1:2.

Figure 4:
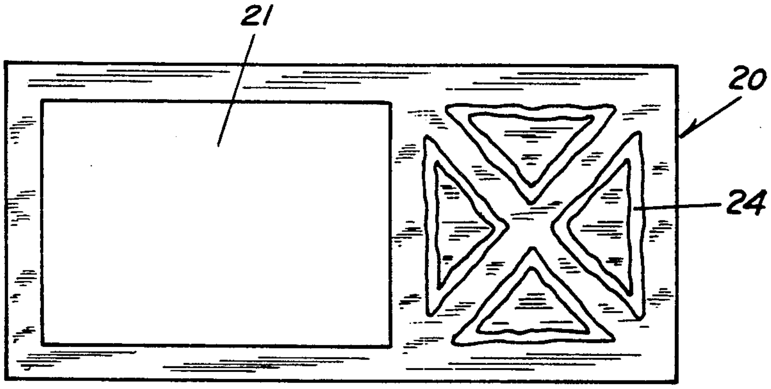
FIG. 4 is a top plan view of a compressible wood fiber board with the filler applied to it before compression.
Figure 5:
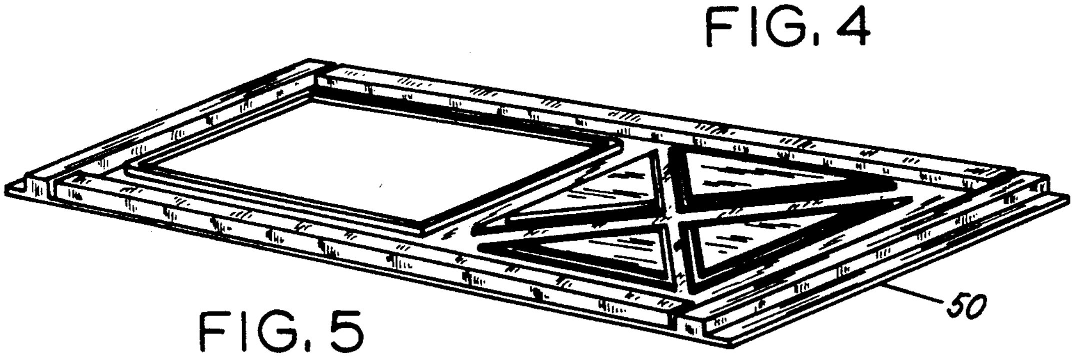
FIG. 5 is a perspective view of the mold which holds the compressible wood fiber board when it is in the press.

4. If desired one surface of the board 20 is next marked with a template 22 that indicates the location of the desired three dimensional design or impression 23. See FIGS. 1, 4, and 6.

5. A fairing or smoothing compound 24 is then dispensed onto the board 20 as indicated by the template 22. Normally this is done by drawing out a $\frac{1}{2}$ inch bead. This compound 24 acts as a filler where the board 20 may tear or tip during the compression process. Please see FIG. 4. Generally, the fairing compound 24 used comprises polyester resin, calcium carbonate, fumed silica, leveling agents, promoters, inhibitors, and initiators. The preferred form of the compound is sold under the name EPIC PA8034 by Epic Resins, a division of General Fiberglass supply, Inc., of 1421 Ellis Street Waukesha, Wis. 53186.

Figure 2:
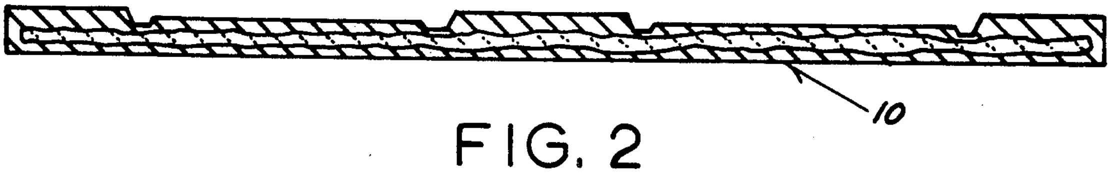
FIG. 2 is a cross-sectional view from line 2—2 of FIG. 1 showing partial penetration of the polyester material into the wood of the door.
Figure 3:
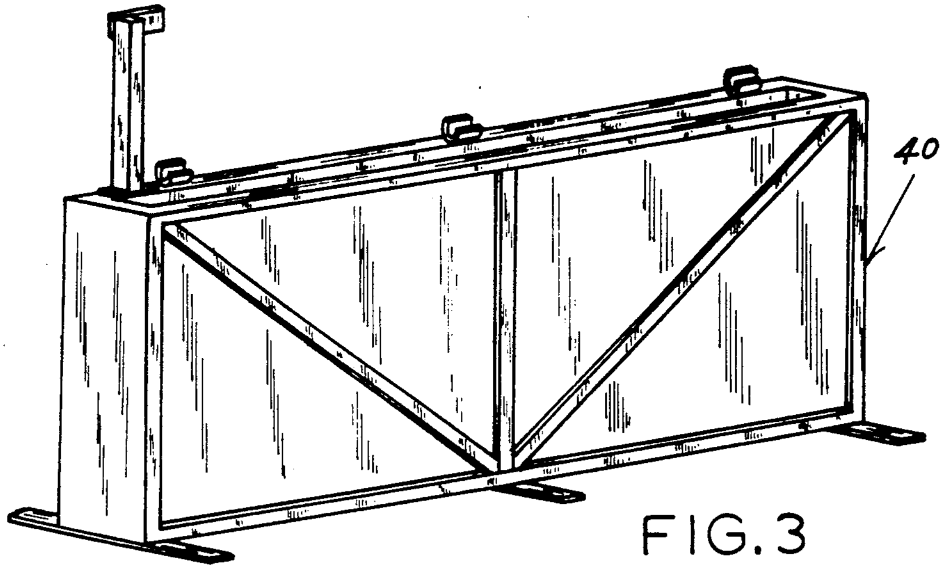
FIG. 3 is a perspective view of the dip tank holding the polyester resin mixture into which the compressible wood fiber boards are dipped.

6. The board 20 is placed in a mold 50 and slid into a heated press 60. The board 20 is then compressed in the press 60. Any suitable type of press 60 may be used. The use of a heated press 60 is preferred because this allows the use of catalysts that will cause polymerization or setting of the polyester resin in a specific temperature range. This gives greater control over the process to the manufacturer. Temperatures in the press 60 range from 230° F. to 300° F. The pressing cycle is three to five minutes depending upon the temperature reached in the press 60. During this time the catalysts contained within the unsaturated resin mixture kick in, in the 230° F. to 300° F. range, causing the resin to become saturated or polymerized. Accordingly, the resin mixture that has soaked into the board 20, encapsulating the wood particles, is polymerized so an exo-skeletal like structure forms around the wood particles within the compressed board 20; rigidly holding the resulting panel or door core 10 in the shape into which it was compressed and enormously increasing its strength. See FIG. 2. Further, this skeletal like structure formed within the resulting panel or door core 10 allows the shape of various three dimensional designs that were pressed into the wood fiber board 20 to be retained; so that a panel or door core 10 having integral three dimensional designs, of almost any depth, may be produced. As may be seen in FIG. 2 the penetration of the polyester resin, mixture into the panel or door core 10 need not be total. Normally, penetration of at least $\frac{1}{8}$ to $\frac{1}{4}$ of an inch is sufficient. The goal is to encapsulate a sufficient amount of wood particles or fibers, contained within the compressible board 20, so that when the polyester resin sets, an integral wood plastic panel or door core 10, having the superior attributes of both materials, is formed.

7. The resulting door core or panel 10 is then placed into a cooling area. The polymerization will continue during cooling for approximately another 24 hours. Therefore, it is ideal that the panels or door cores 10 be prestressed to prevent any curling or warping that may occur during the cooling process. Prestressing may be accomplished by applying pressure through the center length of the panel or door core 10 and in an opposite direction through outer lengths of the panel or door core 10 in directions opposed to the curling tendency of the panel or door core 10. Accordingly, curling of the door 10 core is prevented.

8. After cooling the door core or panel 10 may be painted any desired color. Ideally, a 50% to 100% solids urethane coating is applied to give the doors the texture desired as well as to protect the finish from UV degradation. A urethane coating having a high solids content is preferred to allow for one step coating of the panel or door core 10. Urethane coatings having a lower solids content or any other suitable type of coating, like paint, may also be used. The only problem with using a coating with a lower solids content is that it may take longer to dry and possibly need a primer.

9. The door core or panel 10 is then shipped.

Alternatively, step 3 of the process may be replaced by sending the compressible wood fiber boards 20 through a top and bottom roll coater where approximately 5 to 6 pounds of unsaturated polyester resin mixture 20 is applied to both top and bottom surfaces and then an edge coater where all exposed edges are also saturated with approximately 1 to 2 more pounds of unsaturated polyester resin mixture. Further, the filler mixture of step 5 may be replaced by a mixture of polyester resin and silica/wood flour and dispensed in a ½ inch bead to mark the board 20 before it is compressed into the desired shape.

The above described embodiments of this invention are merely descriptive of its principles and are not to be limited. The scope of this invention instead shall be determined from the scope of the following claims, including their equivalents.

What is claimed is:

1. A single compression molded moisture resistant wood panel having a predetermined weight, said molded moisture resistant wood panel comprising:

a compressed wood fiber board impregnated with a thermosetting plastic resin mixture; the thermosetting plastic resin mixture being at least 23% of the total predetermined weight of said panel;

whereby heat is applied and the shape of the panel is fixed.

2. The molded panel of claim 1 in which the thermosetting polyester mixture comprises:

97.75 parts unsaturated polyester resin;

0.75 parts mold release agent;

1.50 parts catalyst.

3. The molded panel of claim 2 in which the mold release agent is a liquid zinc stearate.

4. The molded panel of claim 2 in which the catalyst is tert-butyl peroxybenzoate.

5. The molded panel of claim 1 having an integral three dimensional design.

6. The molded panel of claim 1 in which substantially all binders and water inhibitors have been removed from the compressed wood fiber board.

7. The molded panel of claim 1 in which the compressed wood fiber board has an initial moisture content and said initial moisture content is reduced 6–8%.

8. A single compression molded moisture resistant wood panel having a predetermined weight, said molded moisture resistant wood panel comprising:

a compressed wood fiber board impregnated with a thermosetting plastic resin mixture;

the thermosetting plastic resin mixture being at least 23% of the total predetermined weight of said panel;

the compressed wood fiber board having substantially all binders and water inhibitors removed.

9. The molded panel of claim 8 in which the thermosetting polyester mixture comprises:

97.75 parts unsaturated polyester resin;

0.75 parts mold release agent;

1.50 parts catalyst.

10. The molded panel of claim 9 in which the mold release agent is a liquid zinc stearate.

11. The molded panel of claim 9 in which the catalyst is tert-butyl peroxybenzoate.

12. The molded panel of claim 8 having an integral three dimensional design.

13. The molded panel of claim 8 in which the compressed wood fiber board has an initial moisture content and said initial moisture content is reduced 6–8%.

14. A single compression molded moisture resistant wood panel having a predetermined weight and a thickness greater than two millimeters, said molded moisture resistant wood panel comprising:

a compressed wood fiber board impregnated with a thermosetting plastic resin mixture;

the thermosetting plastic resin mixture being at least 23% of the total predetermined weight of said panel;

whereby heat is applied and the shape of the panel is fixed.

* * * * *